United States Patent [19]

Foster

[11] Patent Number: 5,353,918
[45] Date of Patent: Oct. 11, 1994

[54] RECIPROCATING CONVEYOR WITH REINFORCED FLOOR MEMBERS

[76] Inventor: Raymond K. Foster, P.O. Box 1, Madras, Oreg. 97741

[21] Appl. No.: 186,173

[22] Filed: Jan. 25, 1994

Related U.S. Application Data

[62] Division of Ser. No. 54,533, Apr. 28, 1993.

[51] Int. Cl.$^5$ ............................................. B65G 25/00
[52] U.S. Cl. ................................................... 198/750
[58] Field of Search ....................... 198/750; 414/525.1

[56] References Cited

U.S. PATENT DOCUMENTS

| | | | |
|---|---|---|---|
| 4,184,587 | 1/1980 | Hallstrom | 198/750 |
| 5,096,356 | 3/1992 | Foster | 198/750 |
| 5,125,502 | 6/1992 | Foster | 198/750 |

Primary Examiner—Cheryl L. Gastineau
Attorney, Agent, or Firm—Joan H. Pauly; Delbert J. Barnard

[57] ABSTRACT

The ball end (16) of the piston rod (14) of a linear motor (6) is mounted in a ball block (52). The block (52) has mating housing portions (54, 56) that abut along mating surfaces (64) that are substantially parallel to, but slope relative to, the motor axis (X). One housing portion includes an integral rear wall (70) through which the axis (X) extends and which defines a portion of a socket (58) that receives the ball end (16). The other housing portion has a flange (78) that projects into a space between the socket (58) and a sloping extension (74) of the wall (70). The outer surface (76) of the wall (70) is secured to a fixed support (84). The wall (70) transmits loads carried by operation of the motor (6) from the ball end (16) directly to the support (84) and minimizes loads on the fasteners (68) securing the housing portions (54, 56) together. The housing portion that includes the wall (70) is made from a material with a high load carrying capability. The other portion is relatively easy to machine and includes a passageway to deliver fluid to the ball end (16). A reinforcing bar (150) extends rearwardly from the motor (6) through a channel formed by a floor member of a reciprocating floor conveyor.

34 Claims, 8 Drawing Sheets

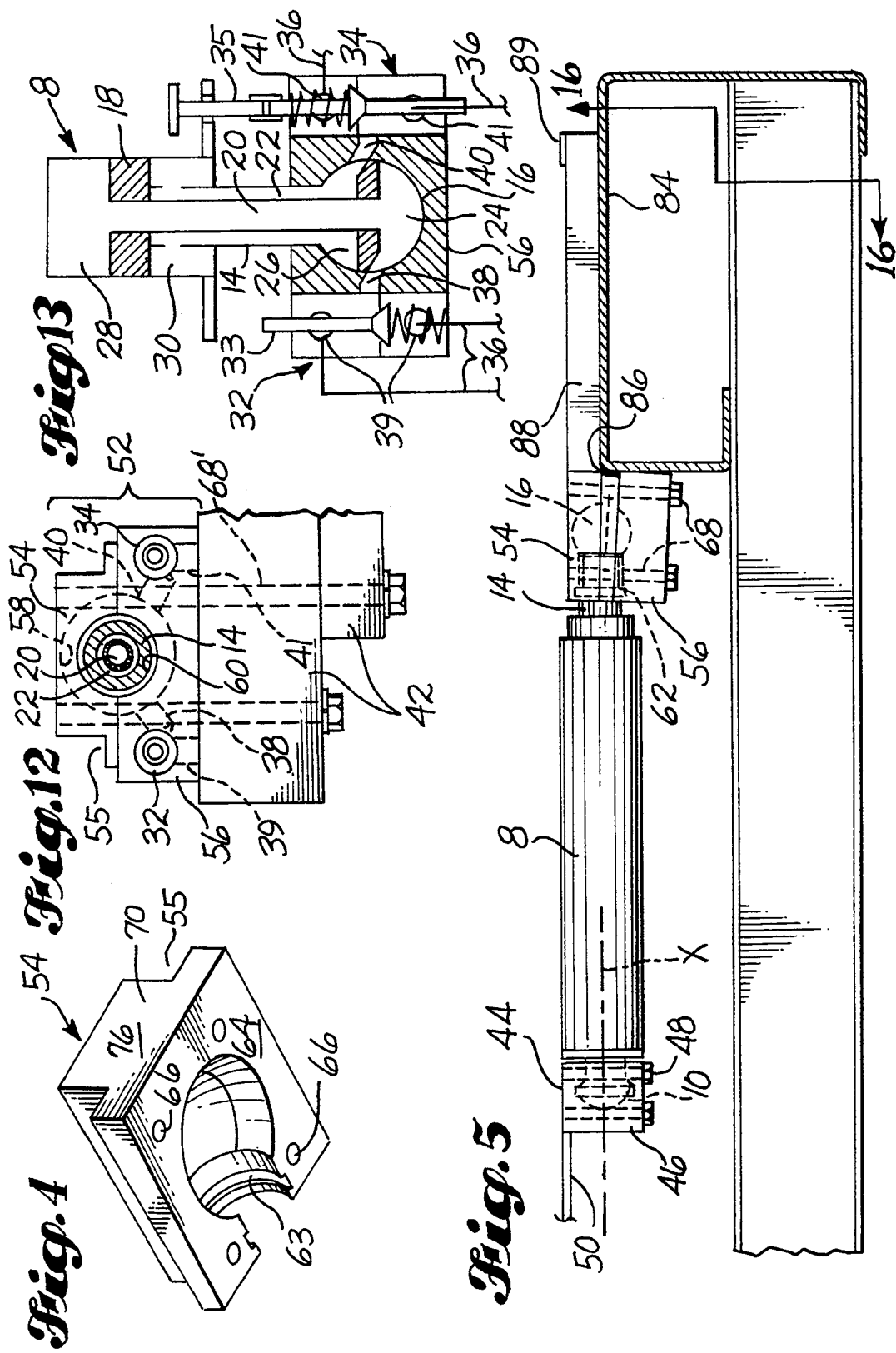

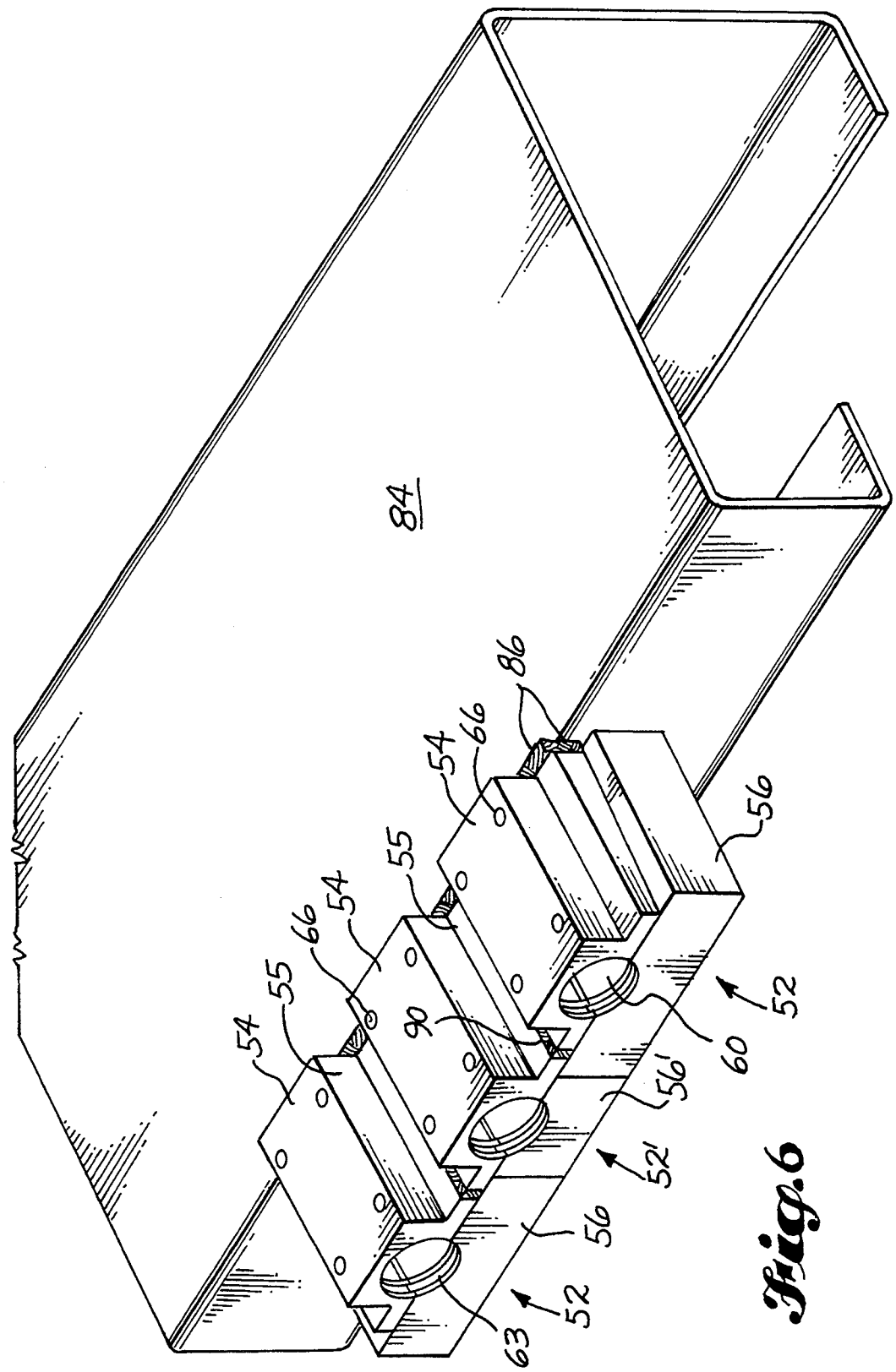

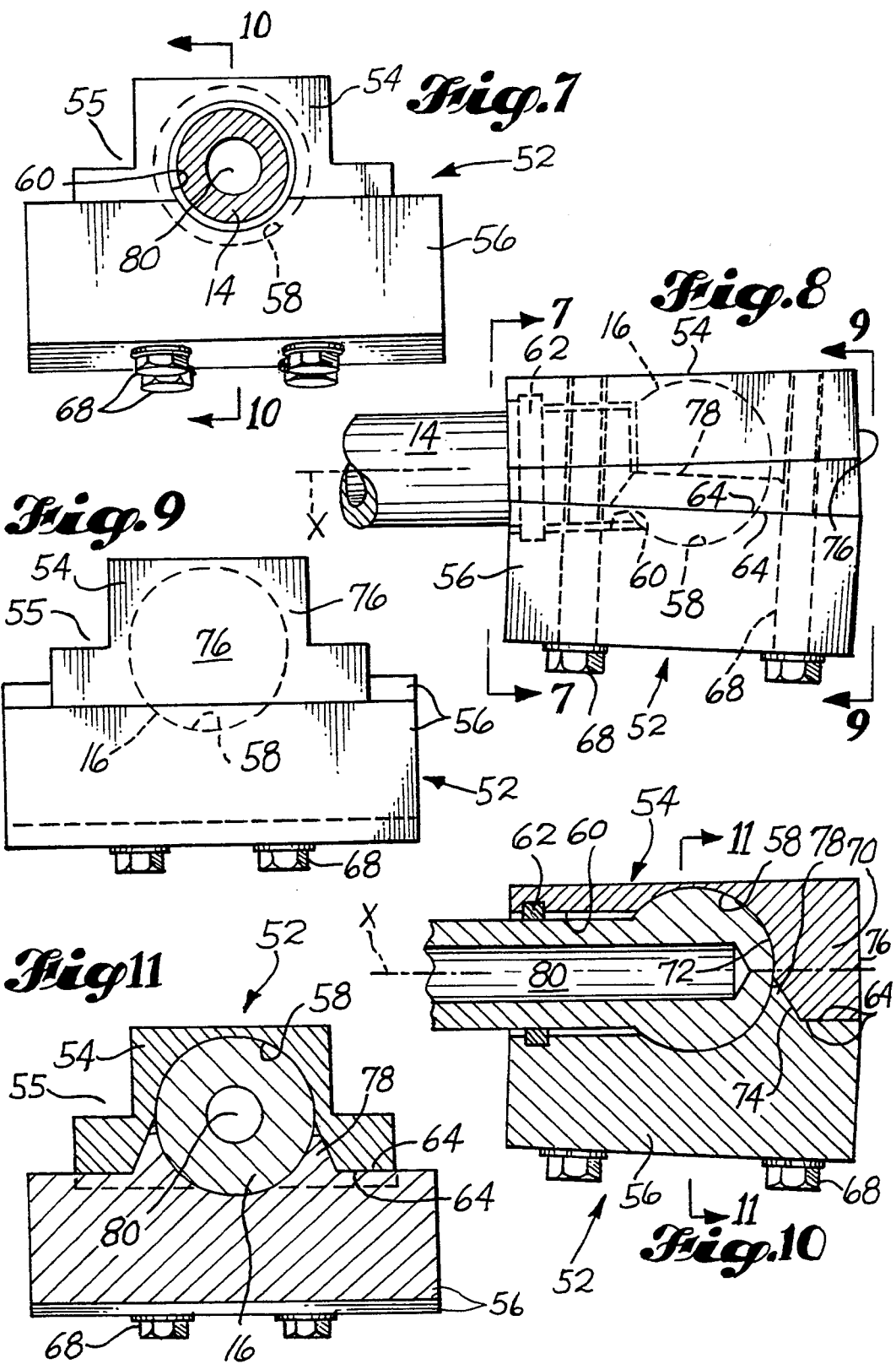

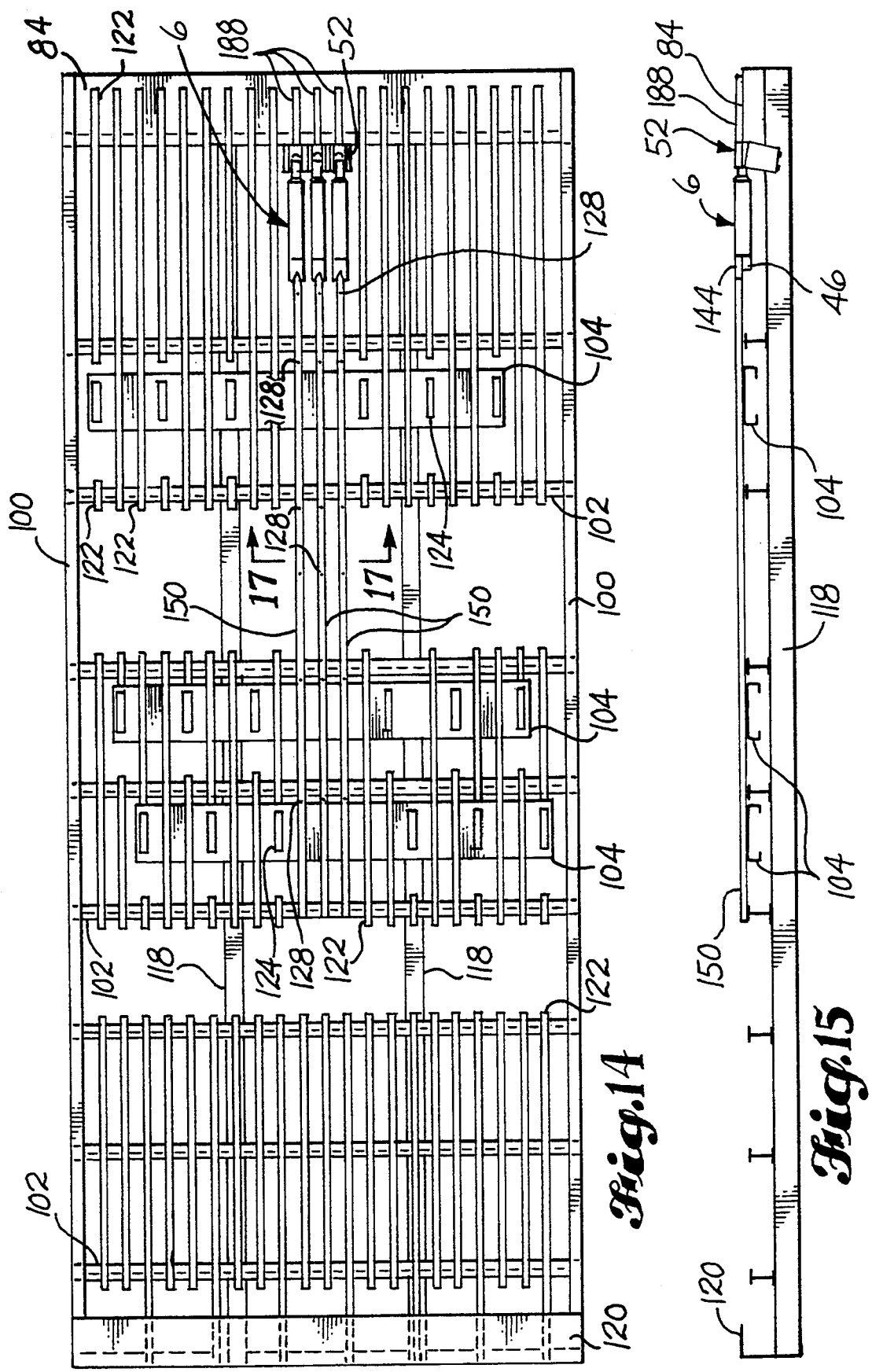

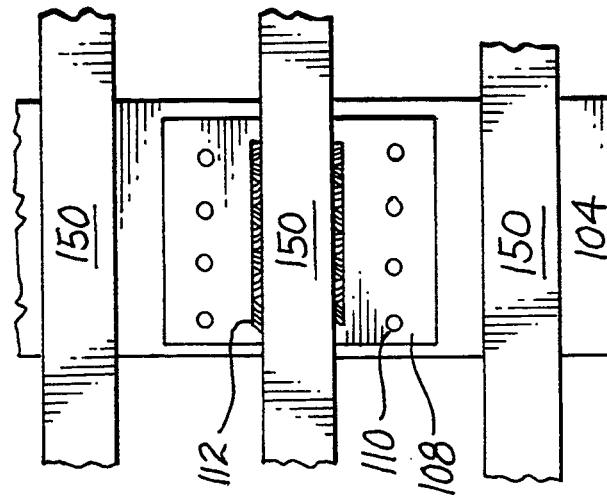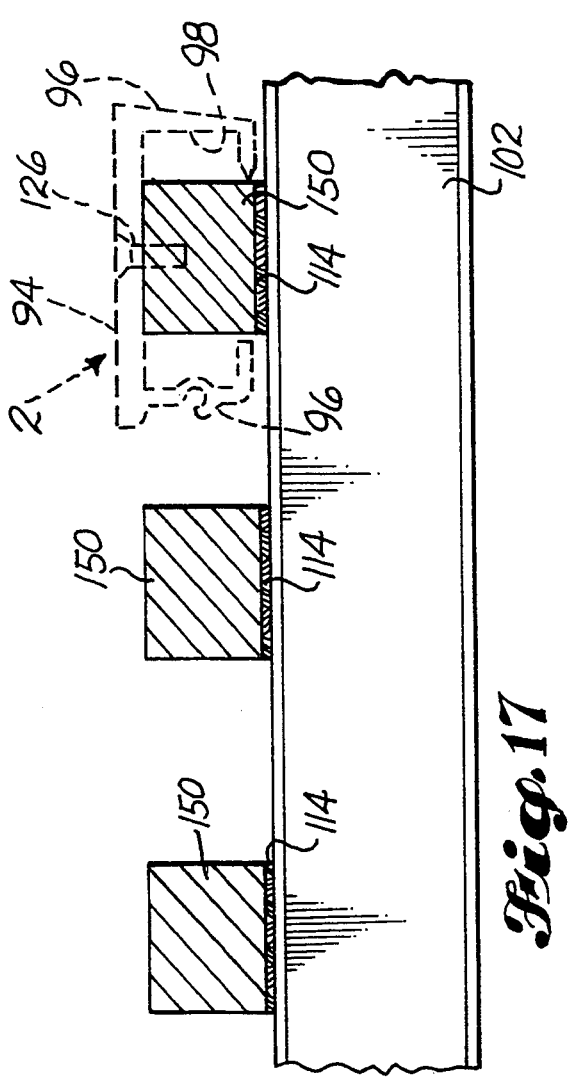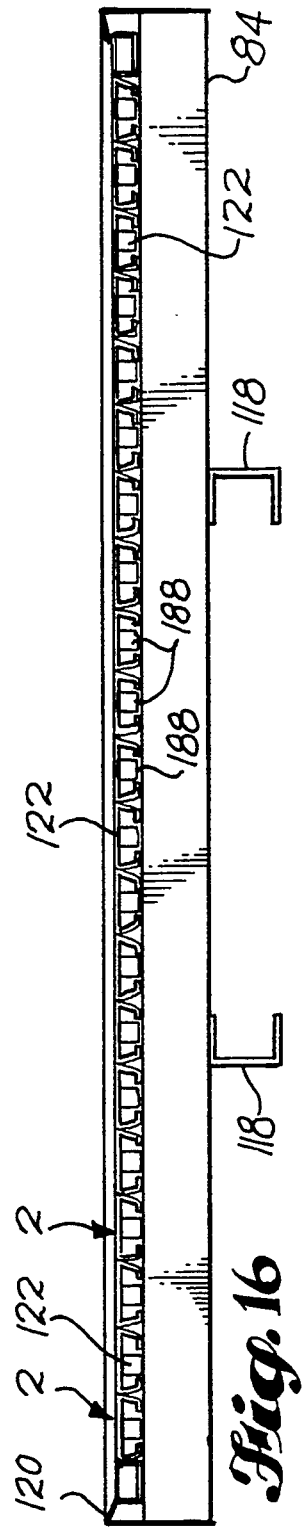

RECIPROCATING CONVEYOR WITH REINFORCED FLOOR MEMBERS

This application is a division, of application Ser. No. 08/054,533, filed Apr. 28, 1993 pending.

TECHNICAL FIELD

This invention relates to reciprocating floor conveyors and, more particularly, to a combination in such a conveyor including a plurality of floor members, a plurality of linear motors, each having a rear end attached to a fixed support and a forward end attached to one of the floor members, reinforcing portions carried by the floor members and attached to the motors to attach the floor members thereto, and transverse drive beams positioned below the floor members and attached to the reinforcing portions.

BACKGROUND INFORMATION

A known type of reciprocating floor conveyor includes a plurality of floor members divided into sets and groups. Each group includes at least two adjacent independent floor members, and each set includes one floor members from each group. The conveyor also has a plurality of linear motors, one for each set of floor members. The motors are operated to reciprocate the floor members to convey a load.

DISCLOSURE OF THE INVENTION

The present invention is directed toward a combination of elements in a reciprocating floor conveyor. According to an aspect of the invention, the combination comprises a plurality of floor members, a plurality of transverse drive beams. The floor members are divided into sets and groups. Each group includes at least two adjacent independent floor members, and each set includes one floor member from each group. There is a linear motor for each set of floor members. Each motor includes a rear end attached to a fixed support and an opposite forward end attached to one of the floor members in the corresponding set. Reinforcing portions are provided for each set of floor members. The reinforcing portions are carried by the floor member to which the forward end of the corresponding motor is attached and reinforce this floor member. The portions are attached to and extend forwardly from the forward end of the corresponding motor. There is also a transverse drive beam for each set of floor members. Each drive beam is positioned below each floor members of its set of floor members and is attached to, and positioned below, the reinforcing portions for its set of floor members.

The combination may further comprise one or more preferred features. One preferred feature is the provision of each motor with a rear ball end and the inclusion in the combination of a plurality of ball blocks, one for each motor. Each ball block defines a cavity into which the ball end of the corresponding motor is received. The ball block is secured to the fixed support to secure the motor thereto. Another preferred feature is a housing for each motor that defines a socket into which the forward end of the motor is received, with the reinforcing portions extending forwardly from the housing.

Preferably, the transverse drive beams are spaced longitudinally along the floor members. For each set of floor members, the reinforcing portions extend above each transverse drive beam and are movable relative to each transverse drive beam other than the drive beam to which they are attached. In embodiments having this arrangement, there are preferably a plurality of bearings carried by the transverse drive beams. The bearings are positioned between each drive beam and the reinforcing portions that are movable relative thereto. Alternatively, the transverse drive beams may be spaced below the reinforcing portions that are movable relative thereto.

In the preferred embodiment, each of the floor members that carries reinforcing portions and is attached to one of the motors includes a top portion and opposite side portions defining a downwardly opening channel. When the floor members have this configuration, the rear end of each motor is preferably received in a motor mount that is secured to the fixed support to secure the motor thereto and that has an upper portion projecting into the channel of the corresponding floor member to position a portion of the motor in the channel. The mount is preferably a ball block. The preferred configuration of the reinforcing portions is a reinforcing bar for each motor. The bar is attached to and extends forwardly from the forward end of the corresponding motor. In the preferred embodiment, the bar is received into the channel of the corresponding floor member and is attached to the top portion to reinforce the floor member Another preferred feature of the combination is a plurality of guide beams, one for each motor. Each guide beam projects rearwardly of its corresponding motor to extend above the fixed support and guide movement of the floor member that is attached to the motor. Each guide beam preferably carries a bearing to support sliding movement of the floor member relative to the guide beam. Still another preferred feature is a combination in which the fixed support comprises a transverse end beam at one end of a conveyor frame. The combination of the invention provides balancing of the loads on the floor members and permits efficient transmission of operational loads to a main frame via a conveyor frame. It also permits the use of relatively lightweight floor members to reduce the overall weight of the conveyor.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 4 is a pictorial view looking up at one of the upper housing portions shown in FIG. 3.

FIG. 5 is an elevational view, with parts shown in section, illustrating the mounting of the ball block shown in FIGS. 1-4 and its assembly with the linear motor.

FIG. 6 is a pictorial view illustrating the mounting of the ball blocks, with the linear motors omitted.

FIG. 7 is a sectional view taken along the line 7—7 in FIG. 8.

FIG. 8 is a side elevational view of the ball block and a portion of the linear motor shown in FIG. 5.

FIG. 9 is an end view taken along the line 9—9 in FIG. 8.

FIG. 10 is a sectional view taken along the line 10—10 in FIG. 7.

FIG. 11 is a sectional view taken along the line 11—11 in FIG. 10.

FIG. 12 is a view similar to FIG. 7 except that it shows the ball block mounted together with a hydraulic manifold and passageways formed in the lower ball block housing portion.

FIG. 13 is a schematic view of the ball block, linear motor, and valves shown in FIG. 12.

FIG. 14 is a partially schematic plan view of a reciprocating floor conveyor incorporating the preferred embodiment of the reinforcing bars of the invention, with the floor members omitted.

FIG. 15 is a partially schematic side elevational view of the conveyor shown in FIG. 14.

FIG. 16 is a partially schematic front elevational view of the conveyor shown in FIGS. 14 and 15.

FIG. 17 is a fragmentary sectional view taken along the line 17—17 in FIG. 14.

FIG. 18 is an enlarged plan view of the portion of the middle transverse drive beam over which the reinforcing bars extend, as shown in FIG. 14.

BEST MODES FOR CARRYING OUT THE INVENTION

Figure 1:
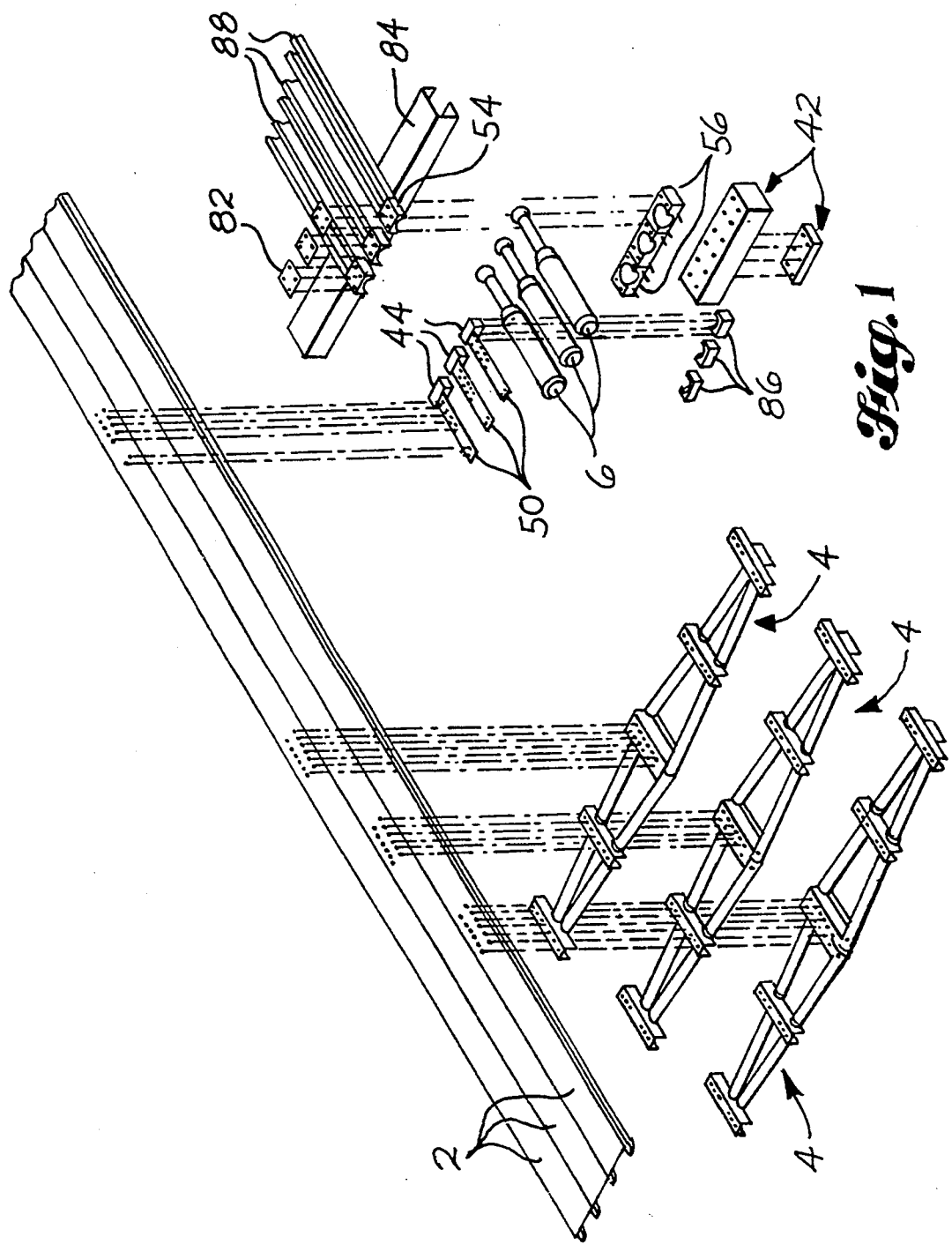
FIG. 1 is an exploded pictorial view of a portion of a reciprocating floor conveyor into which the preferred embodiment of the ball block of the invention has been incorporated.

The drawings show a ball block 52 that is constructed in accordance with the invention and that also constitutes the best mode of the ball block currently known to the applicant. In the drawings, the ball block 52 is shown mounting the ball end 16 of the piston component 12 of a hydraulic linear motor 6. The drawings also illustrate three motors 6 mounted by the ball block of the invention as part of a reciprocating floor conveyor. It is anticipated that the primary use of the ball block of the invention will be in this type of installation. However, it is of course to be understood that the ball block of the invention could also be used to advantage in a wide variety of other types of installations. The ball block of the invention may also be used to mount non-hydraulic linear motors and/or to mount the cylinder component of a linear motor.

The structure of the preferred embodiment of the ball block of the invention can best be seen in FIGS. 3-13. The ball block 52 includes first and second mating housing portions 54, 56. In the assembled block 52, the housing portions 54, 56 abut each other along mating surfaces 64. As shown, these mating surfaces 64 are substantially parallel to the axis X of the linear motor 6 mounted by the block 52, i.e., although they may slope relative to the axis X, their orientation is predominantly parallel, as opposed to perpendicular, to the axis X. The mating surfaces could also be stepped instead of, or in addition to, being sloped relative to the axis X. The two housing portions 54, 56 together define a socket 58 for receiving the ball end 16 of the piston component 12. The socket 58 has a closed rear end portion, and a forward end portion. The rearward direction is indicated by the arrow in FIG. 3. A passageway 60 extends from the forward end portion of the socket 58 through the first and second housing portions 54, 56. The passageway 60 is dimensioned to receive therethrough the piston rod 14. The rod 14 has the ball end 16 formed thereon and projects forwardly from the ball end 16 out from the ball block 52. A plurality of fasteners 68 extend through holes 66 in the housing portions 54, 56 to secure the housing portions 54, 56 together. In the illustrated embodiment, there are four fasteners 68 positioned symmetrically around the socket 58 and extending through the mating surfaces 64.

The passageway 60 has an annular groove 63 formed thereon for receiving an annular seal 62. The seal 62 engages the piston rod 14 to prevent contaminants from entering the ball block 52 through the passageway 60. The seal 62 has sufficient resiliency to allow slight lateral displacement of the piston rod 14 in the passageway 60 to correct for minor misalignments between the ball block 52 and the linear motor 6 without allowing actual metal-to-metal contact between the motor 6 and the block 52.

As shown, the first housing portion is an upper portion 54, and the second housing portion is a lower portion 56. It is anticipated that the ball block of the invention will be used primarily in this orientation. However, the ball block could also be used in other orientations. For example, the first portion could be below, laterally adjacent to, or angled with respect to the second portion.

In the illustrated preferred embodiment, the upper housing portion 54 includes an integral rear wall 70. Referring to FIG. 10, the wall 70 has an inner forward surface 72 and an outer rear surface 76. The inner surface 72 defines a rear portion of the socket 58. The outer surface 76 is securable to a fixed support. The securing of the wall 70 to the support may be accomplished by various means, such as by welding 86, as illustrated in FIGS. 5 and 6. Still referring to FIG. 10, the rear wall 70 extends substantially perpendicularly downwardly past the motor axis X. The axis X extends through the wall 70 and its inner and outer surfaces 72, 76. This arrangement results in the direct transmission of loads created by operation of the linear motor 6 from the ball end 16 of the piston component 12 to a fixed support to which the wall 70 is secured. The loads are transmitted directly through the wall 70, which carries most of the load imposed on the ball block 52 to minimize loads on the fasteners 68.

As noted above, the mating surfaces 64 may slope relative to the motor axis X. In the illustrated preferred embodiment, the mating surfaces 64 slope toward the axis X from the rear end of the block 52 to the forward end of the passageway 60, as best seen in FIGS. 5 and 8. This sloping mating surface feature is preferably provided in combination with the feature of a flange 78 formed on the lower housing portion 56. The inner forward surface 72 of the rear wall 70 of the upper housing portion 54 extends definingly around the socket 58 downwardly past the axis X and then slopes away from the socket 58 to define a space between the socket 58 and the forward surface 72. The flange 78 formed on the lower housing portion 56 projects into this space to cooperate with the forward surface 72 in defining the socket 58. The shape of the flange 78 can best be seen in FIG. 3. The flange 78 extends around the socket 58 and upwardly into the space formed by the rear wall 70. The flange 78 is annular except for an interruption where the passageway 60 extends through the lower housing portion 56. The mating surfaces 64 extend around the flange 78 along the rear portion of the block 52 and from the rear edge to the forward edge of the block 52. The flange 78 carries shear loads and reinforces the rear wall 70.

The combination of the sloping mating surfaces 64 and the flange 78 on the lower housing portion 56 facilitates assembly of the ball end 16 in the block 52 while maintaining efficient direct transmission of operational forces to a fixed structure. The sloping mating surfaces 64 allow the outer surface 76 of the forward wall 70 to project downwardly well beyond the motor axis X, and the forward edge of the mating surfaces 64 to be relatively close to the axis X. The relative closeness of the passageway division to the axis X allows the piston rod 14 to be easily positioned in the passageway 60 when the housing portions 54, 56, are moved together. The relatively large surface area of the outer surface 76 of the rear wall 70 which may be welded to a fixed structure enhances the force transmitting function of the wall 70. The increased securing surface 76 does not inhibit assembly of the block 52 with a motor because of the provision of the flange 78 on the lower housing portion 56 and the complementary sloping extension 74 on the rear wall 70 of the upper housing portion 52. The ball end 16 of the piston component 12 moves easily into the socket 58 as the housing portions 54, 56 are moved together because the top of the flange 78 and the beginning of the sloping extension 74 are both near the axis X.

Figure 2:
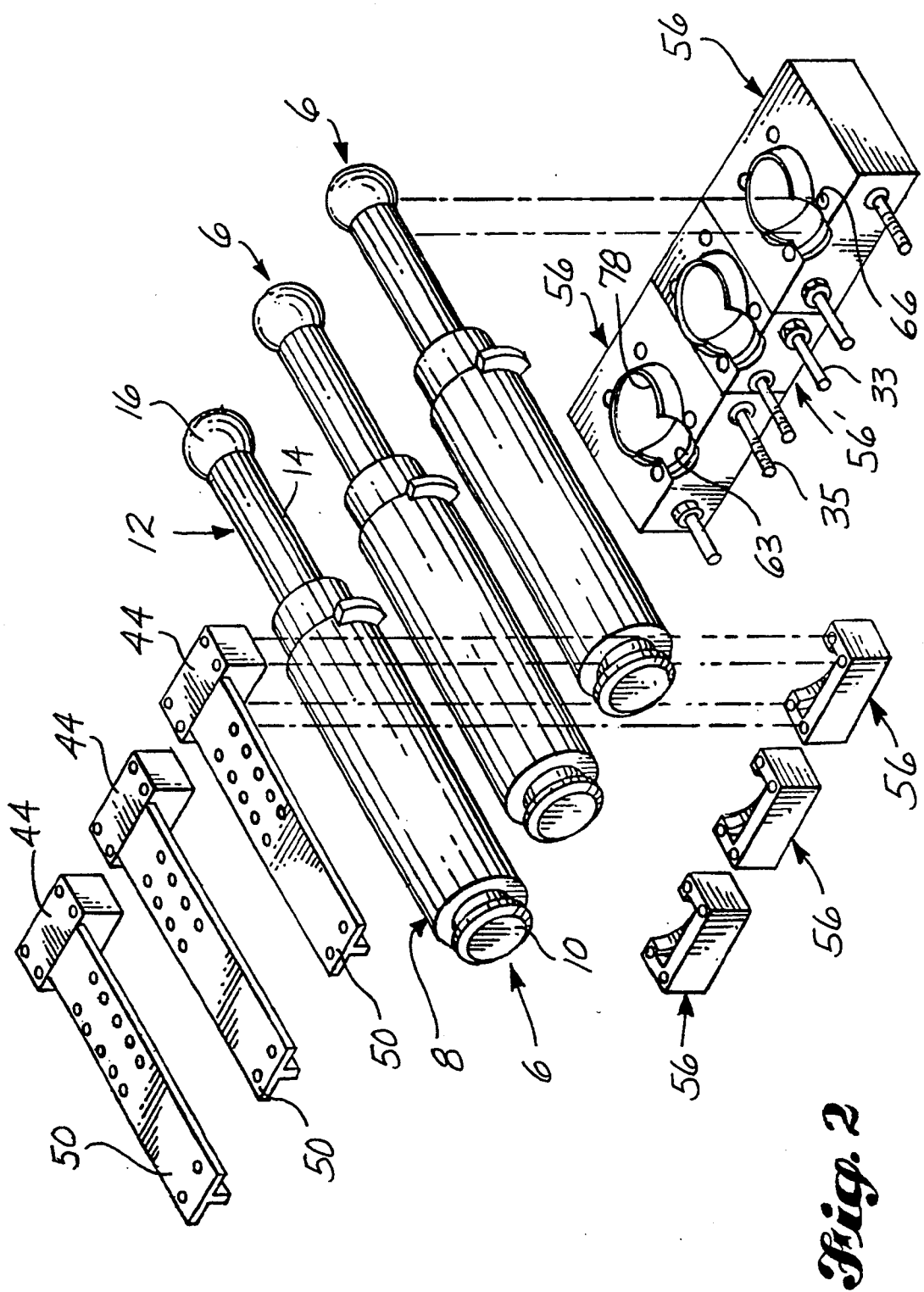
FIG. 2 is an enlarged pictorial view of a portion of FIG. 1, including the lower housing portions of the ball blocks.

FIG. 1 illustrates an example of a type of reciprocating floor conveyor into which the ball block of the invention may be incorporated. This type of conveyor is described in the applicant's U. S. Pat. No. 5,165,524 and No. 5,193,661, issued Nov. 24, 1992, and Mar. 16, 1993, respectively. The disclosures of these two patents all hereby incorporated into this application by reference. The conveyor will only be briefly described herein. Referring to FIG. 1, the conveyor includes a plurality of floor members 2 that are divided into sets and groups. There are three sets and a plurality of groups. Each group includes three adjacent floor members, one from each set. The three floor members 2 in each group are moved together and then are retracted sequentially to move a load supported by the floor members 2. The movement of the floor members 2 is accomplished by means of three linear motors 6. Each motor 6 includes a cylinder component 8 and a piston component 12. The motor 6 is operated to move the cylinder 8 relative to the piston 12 along the motor axis X. FIG. 1 shows one group of floor members 2. Each floor member 2 in the group is connected to its counterparts in the other groups by a transverse drive beam 4. Each of the floor members 2 shown in FIG. 1 is also secured to the movable cylinder component 8 of the corresponding motor 6. Referring to FIGS. 1, 2, and 5, the cylinder component 8 has an end member 10 which is received in a socket formed by a two-part housing 44, 46. The two portions of the housing 44, 46 are secured together by fasteners 48. A connector 50 extends forwardly from the upper housing 44 and is secured to the top portion of the corresponding floor member 2 by suitable fasteners.

As shown in FIGS. 7–11, the piston component 12 of the motor 6 has a generalized passageway 80 extending through the piston rod 14 into the ball end 16 that is received into the ball block socket 58. This generalized passageway 80 is a representation of a fluid passage structure that has been simplified in order to facilitate illustration of the ball block structure in these figures. FIGS. 12 and 13 show the details of the passageway structure shown schematically by passageway 80 in FIGS. 7–11.

Referring to FIGS. 12 and 13, the piston component 12 includes a piston head 18 formed on the end of the rod 14 opposite the ball end 16. A central passageway 20 extends through the rod 14 and the head 18. The central passageway 20 connects a port region 24 in the ball end 16 with an extension chamber 28. An annular passageway 22 surrounding the central passageway 20 connects a port region 26 in the ball end 16 with a retraction chamber 30. The lower housing portion 56 of the ball block 52 has passageways 38, 40 which communicate with the port regions 24, 26, respectively. Communication of the passageways 38, 40 with hydraulic fluid pressure in hydraulic lines 36 is controlled by two check valves 32, 34. Each valve 32, 34 is connected to pressure and return by valve ports 39, 41. The valve 32 is opened mechanically by retraction of the cylinder 8, which brings a projection carried by the cylinder 8 into contact with a control rod 33 projecting from the valve 32. The valve 34 has a control rod 35 that is engaged by a projection carried by the cylinder 8 when the cylinder 8 extends. The hydraulic lines and other components of the hydraulic system are housed in a manifold housing 42. The housing portions 54, 56 and the manifold 42 are secured together by fasteners 68'. The manifold is omitted in FIGS. 2–11 in order to simplify illustration of the invention.

Figure 3:
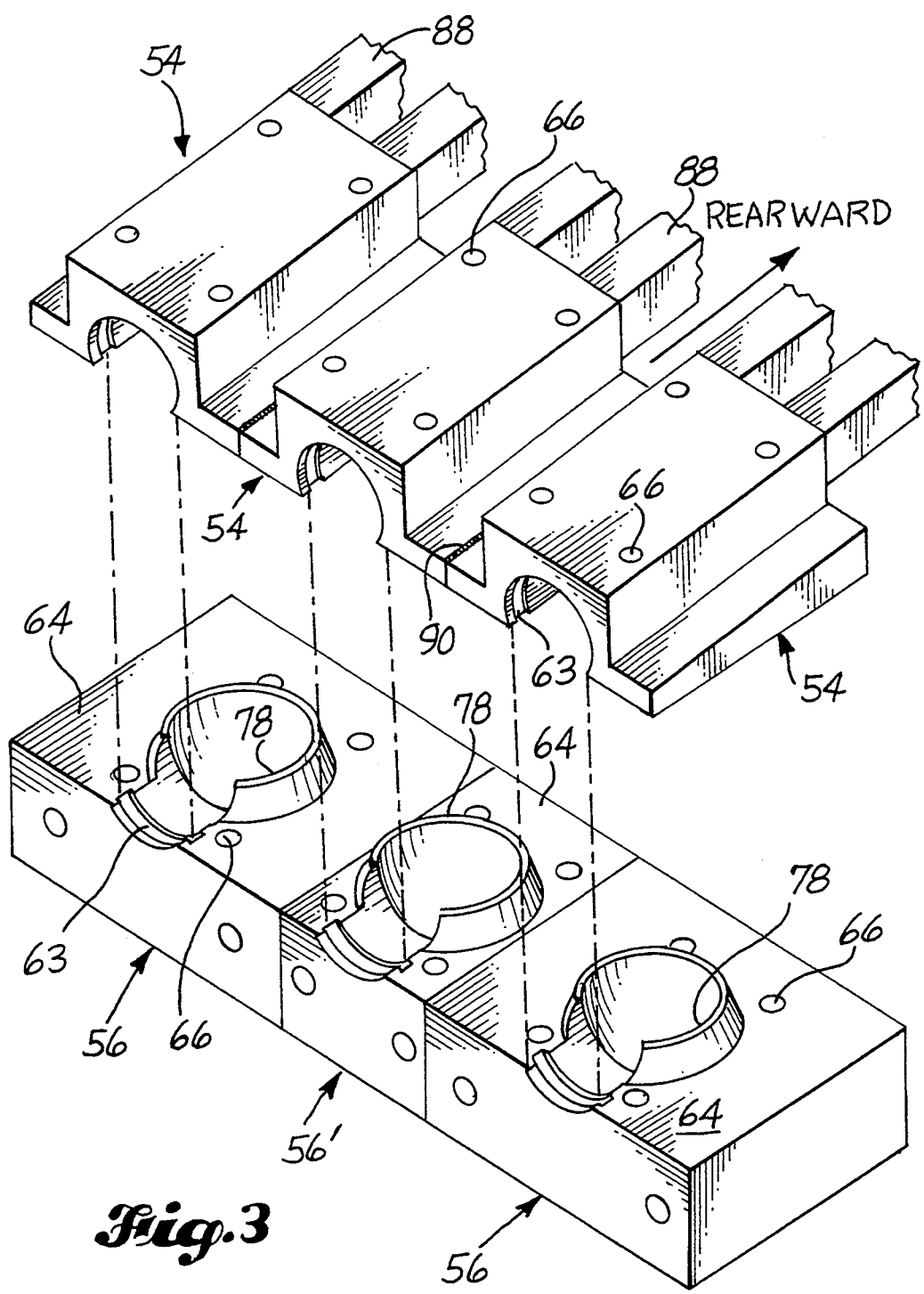
FIG. 3 is an exploded pictorial view of both housing portions of the three ball blocks shown in FIG. 1.

In the type of installation shown in FIG. 1, there are three linear motors 6 each of which is mounted by a ball block of the invention. Referring to FIGS. 2, 3, and 6, the three ball blocks are mounted together in a side-by-side abutting relation. The ball block 52 on each end has the configuration illustrated in FIGS. 7–11. The center ball block 52' has a modified configuration to accommodate the side-by-side mounting. In the modified ball block 52', the lower housing portion 56' is narrower than the lower housing portion 56 of the unmodified ball block 52. Otherwise, the three ball blocks 52, 52' are essentially identical.

Each of FIGS. 1 and 6 shows the upper portions 54 of the three ball blocks 52, 52' secured to a fixed support member In addition, the adjacent upper housing portions 54 are secured to each other by welds 90 (FIG. 6). Two guide beams 88 are secured to and extend rearwardly from the upper portion of the outer rear surface 76 of each of the upper housing portions 54. A bearing member 82 (FIG. 1) is secured to the top of each upper housing portion 54. In the assembled reciprocating floor, the upper housing portions 54 of the ball blocks 52 extend upwardly into the downwardly directed channels of the floor members 2. The guide beams 80 extend rearwardly above the fixed support member 84 and upwardly into the floor member channels to guide reciprocating movement of the floor members 2. Each guide beam 88 preferably carries a bearing 89 (FIG. 5) to support sliding movement of the floor member 2. The bearing members 82 on the ball blocks 52 also support sliding movement of the floor members 2. The upper housing portions 54 have side recesses 55 to provide clearance for the downwardly extending sides of the floor member channels.

The housing portions 54, 56 of the ball block 52 may be made from various materials and may be made from the same or different materials. In the preferred embodiment, the two portions are made from different materials to maximize the load carrying capability of the ball block 52 while increasing ease of manufacture. The upper portion 54 is made from a material, such as hard steel, that has a high load carrying capability. The lower portion is made from aluminum or some other metal which, although it does not have the strength of hard steel, is relatively easily machined. This allows passageways, such as passageways 38, 40, to be economically formed in the lower portion 56 and, at the same time, maximizes the strength of the load-carrying upper portion 54.

FIGS. 14–18 show another type of reciprocating floor conveyor that is similar to the conveyor shown in FIG. 1 but incorporates additional preferred features of the invention. The conveyor shown in FIGS. 14–18 includes the preferred embodiment of the ball block 52, which mounts three linear motors 6, as described above. The major difference between the two types of installations is the manner in which the forward ends of the motors 6 are secured to their respective floor members 2. The floor members 2 are arranged in sets and groups, as described above. The floor members are omitted from FIGS. 14, 15, and 18, and only one floor member 2 is shown in phantom in FIG. 17, to facilitate illustration of the connecting arrangement. Referring to FIGS. 16 and 17, each floor member 2 includes a top portion 94 and opposite side portions 96 that define a downwardly opening channel 98. The upper housing, portions of the ball blocks 52 are received into these channels 98. Each ball block 52 has a single guide beam 188 projecting rearwardly therefrom which is also received into the channel 98 and guides and supports the floor member 2, as described above in relation to the guide beams 88 in the arrangement shown in FIGS. 1–5.

Referring to FIG. 14, the conveyor comprises a frame that includes opposite side members 100, an end beam 120, and the support member 84 to which the ball blocks 52 are secured. A plurality of transverse beams 102 are longitudinally spaced between the end members 84, 120 and extend between the side beams 100. The conveyor frame is secured to a main frame beam 118 of a structure, such as a trailer, in which the conveyor is installed, as shown in FIGS. 14–16. The ball block of the invention and the connections of the linear motors to the floor members described below are designed to transmit operational loads to the main frame beam 118 via the conveyor frame.

In the installation shown in FIGS. 14–18, the connectors 50 shown in FIGS. 1, 2, and 5 are replaced by reinforcing bars 150. There is a bar 150 attached to and extending forwardly from the forward end of each motor 6. Like the connector 50, the bar 150 is received into the channel 98 of the corresponding floor member 2 and is attached to the top portion 94 of the floor member 2. The bar 150 is a solid member with a square cross section and serves to reinforce the floor member 2 to which it is attached, as well as to connect the motor 6 to the floor member 2. As can be seen in FIG. 15, the upper portion 144 of the housing that receives the forward end of the motor 6 is modified to accommodate the attachment of the reinforcing bar 150. In the conveyor shown in FIGS. 14–18, the transverse drive beams 104 also have a different structure than the transverse drive beams 4 shown in FIG. 1. Each transverse drive beam 104 has a channel configuration with a generally C-shaped cross section.

The transverse drive beams 104 are spaced longitudinally along the floor members 2. Preferably, each reinforcing bar 150 extends through its corresponding channel 98 above each of the three transverse drive beams 104. Each reinforcing bar 150 is attached to the transverse drive beam 104 that corresponds to its set of floor members 2 and is movable relative to the other transverse drive beams 104. Each drive beam 104 is positioned below both each floor member 2 that it crosses and the three reinforcing bars 150. FIG. 18 illustrates the relationship between the reinforcing bars 150 and the middle transverse drive beam 104. As shown, only the middle bar 150 is attached to the drive beam 104. The attachment is accomplished by means of a mounting plate 108 that is secured to the drive beam 104 by fasteners 110. The bar 150 is welded, as shown by reference numeral 112, to the mounting plate 108. The other two bars 150 may either be spaced above the drive beam 104 or may be slidingly supported thereon by bearings, such as the type of plastic bearings 114 shown in FIG. 17.

FIG. 17 illustrates the relationship between the reinforcing bars 150 and a transverse beam 102 of the conveyor frame. Each bar 150 is slidable across the beam 102 and is supported thereon by plastic bearings 114. FIG. 17 also illustrates the attachment of one of the bars 150 to a floor member 2. The bar 150 is secured to the top portion 94 of the floor member 2 by a countersunk fastener 126. FIG. 14 shows other locations 128 at which the bars 150 are fastened to the floor members 2. Still referring to FIG. 14, each of the transverse drive beams 104 is provided with mounting projections 124 for securing it to the floor members in its set other than the floor member to which the corresponding reinforcing bar 150 is secured. Guide beams 122 of various lengths are provided for guiding movement of these other floor members and the forward ends of the floor members to which the reinforcing bars 150 are attached. For each of these latter three floor members, the reinforcing bar 150 and guide beams 122,188 are aligned to accurately guide reciprocating movement of the floor members and thereby ensure smooth operation of the conveyor. They are also substantially aligned with the motor axis X to reduce operational loads on the conveyor.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. In a reciprocating floor conveyor, the combination comprising:

a plurality of floor members divided into sets and groups, each group including at least two adjacent independent floor members, and each set including one floor member from each group;

a plurality of linear motors, one for each set of floor members; each said motor including a rear end attached to a fixed support, and an opposite forward end attached to one of the floor members in the corresponding set; and each said one of the floor members including a top portion and opposite side portions defining a downwardly opening channel;

a plurality of reinforcing bars, one for each motor; each said bar being attached to and extending forwardly from said forward end of its corresponding motor, said bar being received into said channel of the corresponding floor member and being attached to said top portion to reinforce said corresponding floor member; and a plurality of transverse drive beams, one for each set of floor members; each drive beam being positioned below each floor member of its set of floor members, and being attached to, and positioned below, the reinforcing bar for its set of floor members.

2. The combination of claim 1, further comprising a plurality of guide beams, one for each said motor; each said guide beam projecting rearwardly of its corresponding motor to extend above said fixed support and guide movement of the floor member that is attached to the motor.

3. The combination of claim 1, in which each said motor has a rear ball end; and which comprises a plurality of ball blocks, one for each said motor; each said ball block defining a cavity into which said ball end of the corresponding motor is received, and being secured to said fixed support to secure the motor thereto.

4. The combination of claim 3, further comprising a plurality of guide beams, one for each said motor; each said guide beam being secured to an upper rear portion of said ball block and projecting rearwardly therefrom to extend above said fixed support and guide movement of the floor member that is attached to the motor.

5. The combination of claim 4, comprising a bearing carried by each said guide beam to support sliding movement of the floor member relative to the guide beam.

6. The combination of claim 1, which comprises, for each said motor, a housing that defines a socket into which said forward end of the motor is received; and in which said reinforcing bars extend forwardly from said housings.

7. The combination of claim 3, which comprises, for each said motor, a housing that defines a socket into which said forward end of the motor is received; and in which said reinforcing bars extend forwardly from said housings.

8. The combination of claim 7, further comprising a plurality of guide beams, one for each said motor; each said guide beam being secured to an upper rear portion of said ball block and projecting rearwardly therefrom to extend above said fixed support and guide movement of the floor member that is attached to the motor.

9. The combination of claim 1, in which said transverse drive beams are spaced longitudinally along said floor members, and each said reinforcing bar extends through its corresponding channel above each said transverse drive beam and is movable relative to each said transverse drive beam other than the drive beam to which it is attached.

10. The combination of claim 9, comprising a plurality of bearings carried by said transverse drive beams, said bearings being positioned between each said drive beam and each reinforcing bar that is movable relative thereto.

11. The combination of claim 9, in which each said transverse drive beam is spaced below each said reinforcing bar that is movable relative thereto.

12. The combination of claim 9, further comprising a plurality of guide beams, one for each said motor; each said guide beam projecting rearwardly of its corresponding motor to extend above said fixed support and guide movement of the floor member that is attached to the motor.

13. The combination of claim 9, in which each said motor has a rear ball end; and which comprises a plurality of ball blocks, one for each said motor; each said ball block defining a cavity into which said ball end of the corresponding motor is received, and being secured to said fixed support to secure the motor thereto.

14. The combination of claim 13, further comprising a plurality of guide beams, one for each said motor; each said guide beam being secured to an upper rear portion of said ball block and projecting forwardly therefrom to extend above said fixed support and guide movement of the floor member that is attached to the motor.

15. The combination of claim 14, comprising a bearing carried by each said guide beam to support sliding movement of the floor member relative to the guide beam.

16. The combination of claim 9, which comprises, for each said motor, a housing that defines a socket into which said forward end of the motor is received; and in which said reinforcing bars extend forwardly from said housings.

17. The combination of claim 13, which comprises, for each said motor, a housing that defines a socket into which said forward end of the motor is received; and in which said reinforcing bars extend forwardly from said housings.

18. The combination of claim 17, further comprising a plurality of guide beams, one for each said motor; each said guide beam being secured to an upper rear portion of said ball block and projecting rearwardly therefrom to extend above said fixed support and guide movement of the floor member that is attached to the motor.

19. The combination of claim 1, in which the conveyor comprises a frame that includes a transverse end beam at one end of the conveyor, and in which said fixed support comprises said transverse end beam.

20. The combination of claim 19, further comprising a plurality of guide beams, one for each said motor; each said guide beam projecting rearwardly of its corresponding motor to extend above said transverse end beam and guide movement of the floor member that is attached to the motor.

21. The combination of claim 19, in which said transverse drive beams are spaced longitudinally along said floor members, and each said reinforcing bar extends through its corresponding channel above each said transverse drive beam and is movable relative to each said transverse drive beam other than the drive beam to which it is attached.

22. The combination of claim 3, in which each said ball block comprises an upper housing portion that projects upwardly into the channel of the floor member to which the forward end of the corresponding motor is attached, each said ball block positioning a portion of the corresponding motor in the channel of the floor member to which the motor is attached.

23. The combination of claim 22, further comprising a plurality of guide beams, one for each said motor; each said guide beam being secured to an upper rear portion of said upper housing portion of said ball block and projecting rearwardly therefrom to extend above said fixed support and guide movement of the floor member that is attached to the motor.

24. The combination of claim 13, in which each said ball block comprises an upper housing portion that projects upwardly into the channel of the floor member to which the forward end of the corresponding motor is attached, each said ball block positioning a portion of the corresponding motor in the channel of the floor member to which the motor is attached.

25. The combination of claim 24, further comprising a plurality of guide beams, one for each said motor; each said guide beam being secured to an upper rear portion of said upper housing portion of said ball block and projecting rearwardly therefrom to extend above said fixed support and guide movement of the floor member that is attached to the motor.

26. The combination of claim 1, which comprises a plurality of motor mounts, one for each said motor; each said motor mount receiving said rear end of the corresponding motor and being secured to said fixed support to secure the motor thereto; and each said motor mount having an upper portion that projects upwardly into the channel of the floor member to which the motor is attached, and positioning a portion of the motor in said channel.

27. The combination of claim 26, further comprising a plurality of guide beams, one for each said motor; each said guide beam being secured to an upper rear portion of said upper portion of said motor mount and projecting rearwardly therefrom to extend above said fixed support and guide movement of the floor member that is attached to the motor.

28. In a reciprocating floor conveyor, the combination comprising:
  a plurality of floor members divided into sets and groups, each group including at least two adjacent independent floor members, and each set including one floor member from each group;
  a plurality of linear motors, one for each set of floor members; each said motor including a rear end attached to a fixed support, and an opposite forward end attached to one of the floor members in the corresponding set;
  for each set of floor members, reinforcing portions carried by said one of the floor members and reinforcing said one of the floor members; said reinforcing portions being attached to and extending forwardly from said forward end of the corresponding motor; and
  a plurality of transverse drive beams, one for each set of floor members; each drive beam being positioned below each floor member of its set of floor members, and being attached to, and positioned below, said reinforcing portions for its set of floor members.

29. The combination of claim 28, in which each said motor has a rear ball end; and which comprises a plurality of ball blocks, one for each said motor; each said ball block defining a cavity into which said ball end of the corresponding motor is received, and being secured to said fixed support to secure the motor thereto.

30. The combination of claim 29, which comprises, for each said motor, a housing that defines a socket into which said forward end of the motor is received; and in which said reinforcing portions extend forwardly from said housings.

31. The combination of claim 28, Which comprises, for each said motor, a housing that defines a socket into which said forward end of the motor is received; and in which said reinforcing portions extend forwardly from said housings.

32. The combination of claim 28, in which said transverse drive beams are spaced longitudinally along said floor members; and, for each set of floor members, said reinforcing portions extend above each said transverse drive beam and are movable relative to each said transverse drive beam other than the drive beam to which they are attached.

33. The combination of claim 32, comprising a plurality of bearings carried by said transverse drive beams, said bearings being positioned between each said drive beam and said reinforcing portions that are movable relative thereto.

34. The combination of claim 32, in which each said transverse drive beam is spaced below said reinforcing portions that are movable relative thereto.

* * * * *

UNITED STATES PATENT AND TRADEMARK OFFICE
CERTIFICATE OF CORRECTION

PATENT NO. : 5,353,918
DATED : October 11, 1994
INVENTOR(S) : Raymond Keith Foster It is certified that error appears in the above-indentified patent and that said Letters Patent is hereby corrected as shown below:

Column 1, line 25, "members" should be -- member --.

Column 1, line 34, after "a plurality of", insert
-- linear motors, reinforcing portions, and a plurality of --.

Column 1, line 50, "members" should be -- member --.

Column 2, line 37, "The combination" should begin a new paragraph.

Column 5, line 6, "forward" should be -- rear --.

Column 6, line 41, after "member", insert -- 84. --.

Claim 14, column 10, line 7, "forwardly" should be -- rearwardly --.

Claim 31, column 12, line 20, "Which" should be -- which --.

Signed and Sealed this

Tenth Day of September, 1996

Attest:

BRUCE LEHMAN

Attesting Officer

Commissioner of Patents and Trademarks